United States Patent
Semrow et al.

(10) Patent No.: US 12,258,992 B2
(45) Date of Patent: Mar. 25, 2025

(54) FASTENER INSERT

(71) Applicant: Illinois Tool Works Inc., Glenview, IL (US)

(72) Inventors: Thomas Michael Semrow, Waukesha, WI (US); Albert J. Dapoz, Sterling Heights, MI (US)

(73) Assignee: Illinois Tool Works Inc., Glenview, IL (US)

( * ) Notice: Subject to any disclaimer, the term of this patent is extended or adjusted under 35 U.S.C. 154(b) by 213 days.

(21) Appl. No.: 17/860,450

(22) Filed: Jul. 8, 2022

(65) Prior Publication Data
US 2023/0051901 A1    Feb. 16, 2023

Related U.S. Application Data
(60) Provisional application No. 63/232,824, filed on Aug. 13, 2021.

(51) Int. Cl.
*F16B 37/12* (2006.01)
(52) U.S. Cl.
CPC ................. *F16B 37/125* (2013.01)
(58) Field of Classification Search
CPC ............... F17B 37/122; F17B 37/068
USPC ........................................... 411/180
See application file for complete search history.

(56) References Cited

U.S. PATENT DOCUMENTS

| | | | | |
|---|---|---|---|---|
| 1,922,120 A | * | 8/1933 | Brosig | F16B 37/122 411/80.6 |
| 3,159,074 A | * | 12/1964 | Neuschotz | F16B 37/122 411/422 |
| 3,200,691 A | * | 8/1965 | Neuschotz | F16B 33/02 411/422 |
| 4,423,616 A | * | 1/1984 | Pease | F16B 37/02 72/356 |
| 4,709,973 A | * | 12/1987 | Waters | F16B 37/122 439/82 |
| 4,840,524 A | * | 6/1989 | Bisping | B60M 1/307 174/138 D |
| 5,201,624 A | * | 4/1993 | Ecktman | F16B 33/002 411/456 |
| 5,641,256 A | * | 6/1997 | Gundy | F16B 13/124 411/902 |
| 9,080,593 B2 | | 7/2015 | Levey | |
| 9,109,620 B2 | * | 8/2015 | Pecho | F16B 37/068 |
| 9,903,409 B2 | | 2/2018 | Prabhu | |
| 2002/0021948 A1 | * | 2/2002 | Stumpf | F16B 37/122 411/180 |

* cited by examiner

*Primary Examiner* — Flemming Saether
(74) *Attorney, Agent, or Firm* — McAndrews, Held & Malloy, Ltd.

(57) ABSTRACT

Disclosed is a fastener insert configured to join two components. The fastener insert includes an embeddable shank having an exterior surface and an axial opening. The embeddable shank can be inserted, embedded, and locked into a first component. The exterior surface defines a plurality of lobes extending around said embeddable shank. Each of the plurality of lobes has a leading edge. In some examples, a plurality of grooves of the exterior surface form a chevron groove pattern on each of the plurality of lobes.

20 Claims, 9 Drawing Sheets

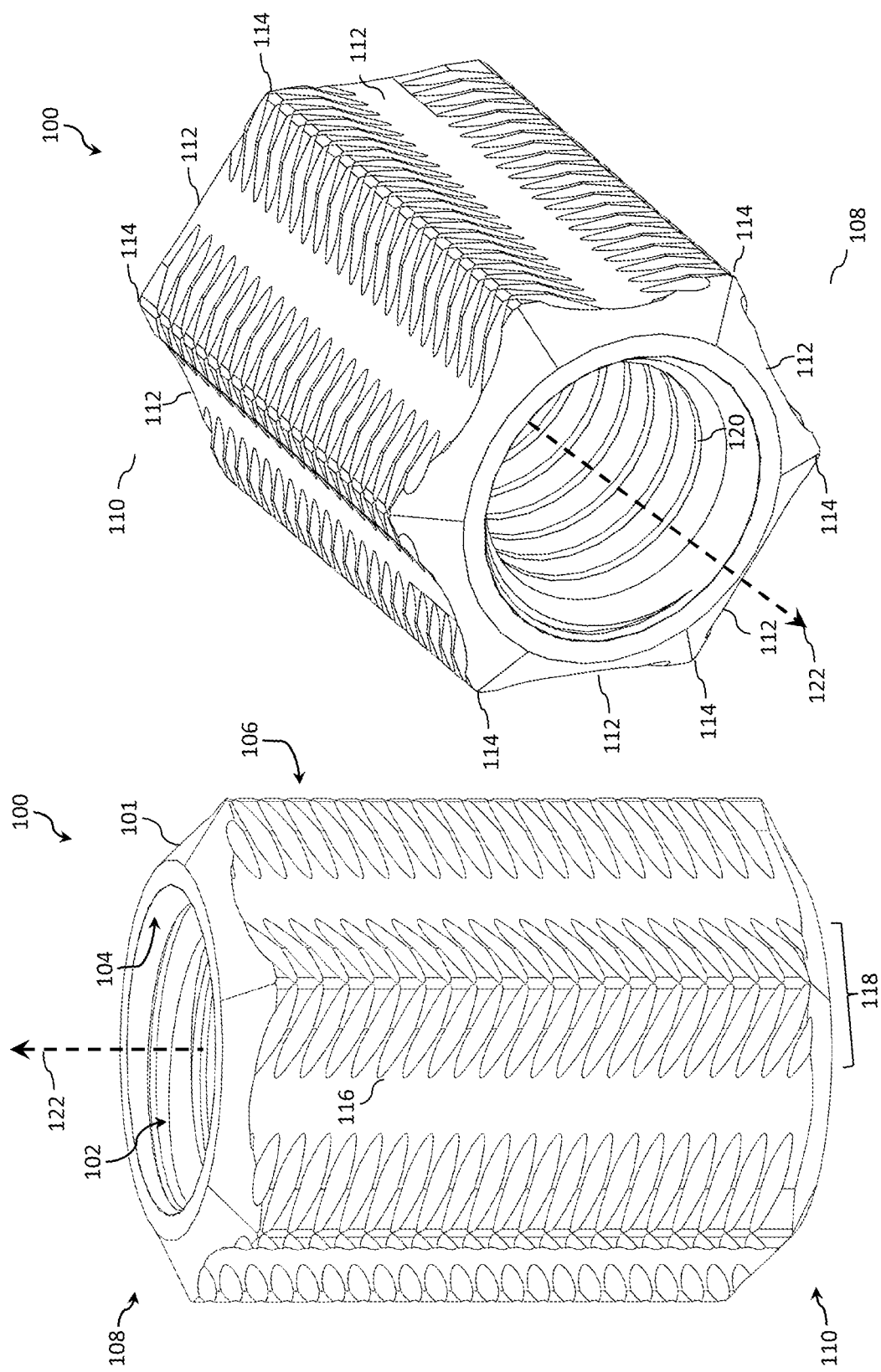

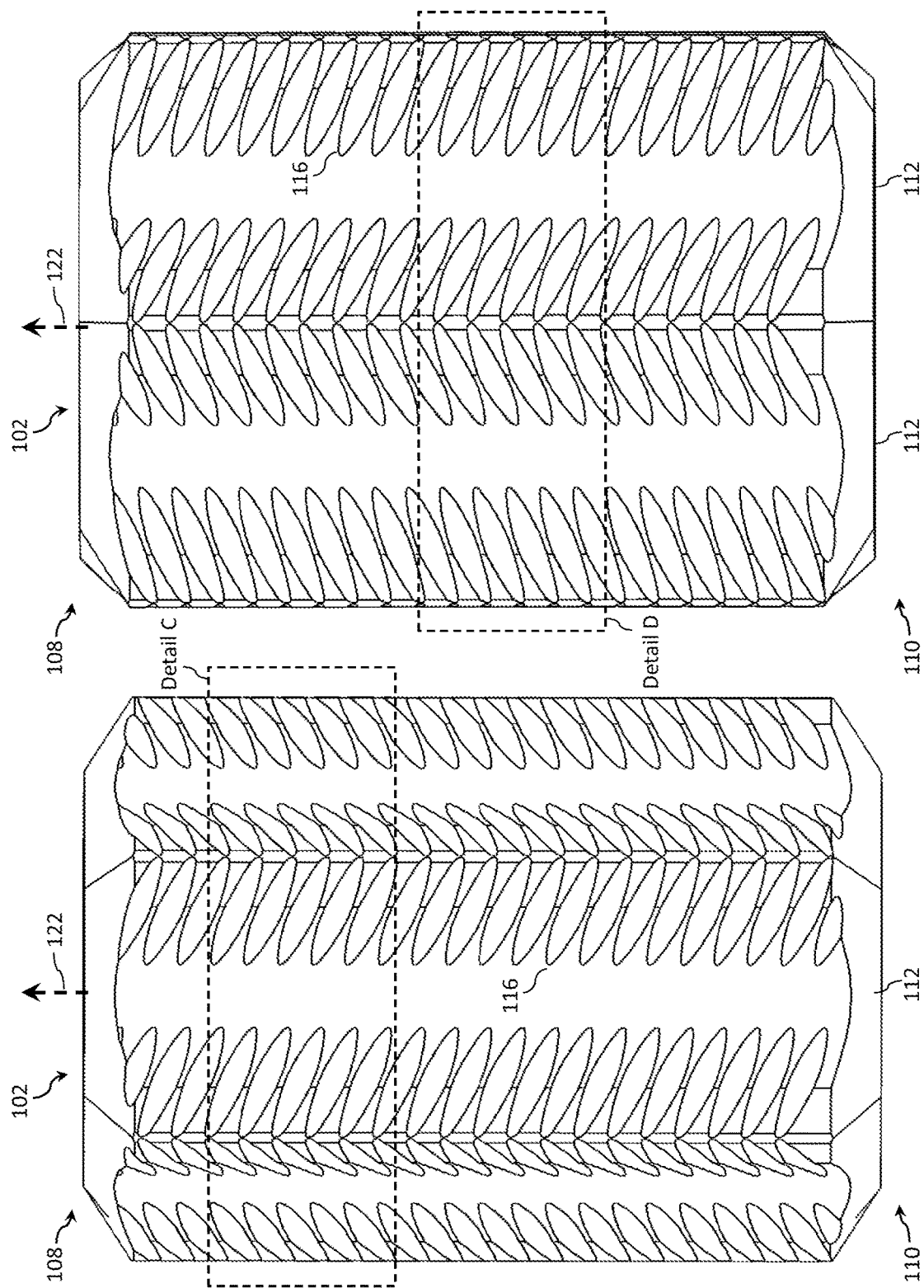

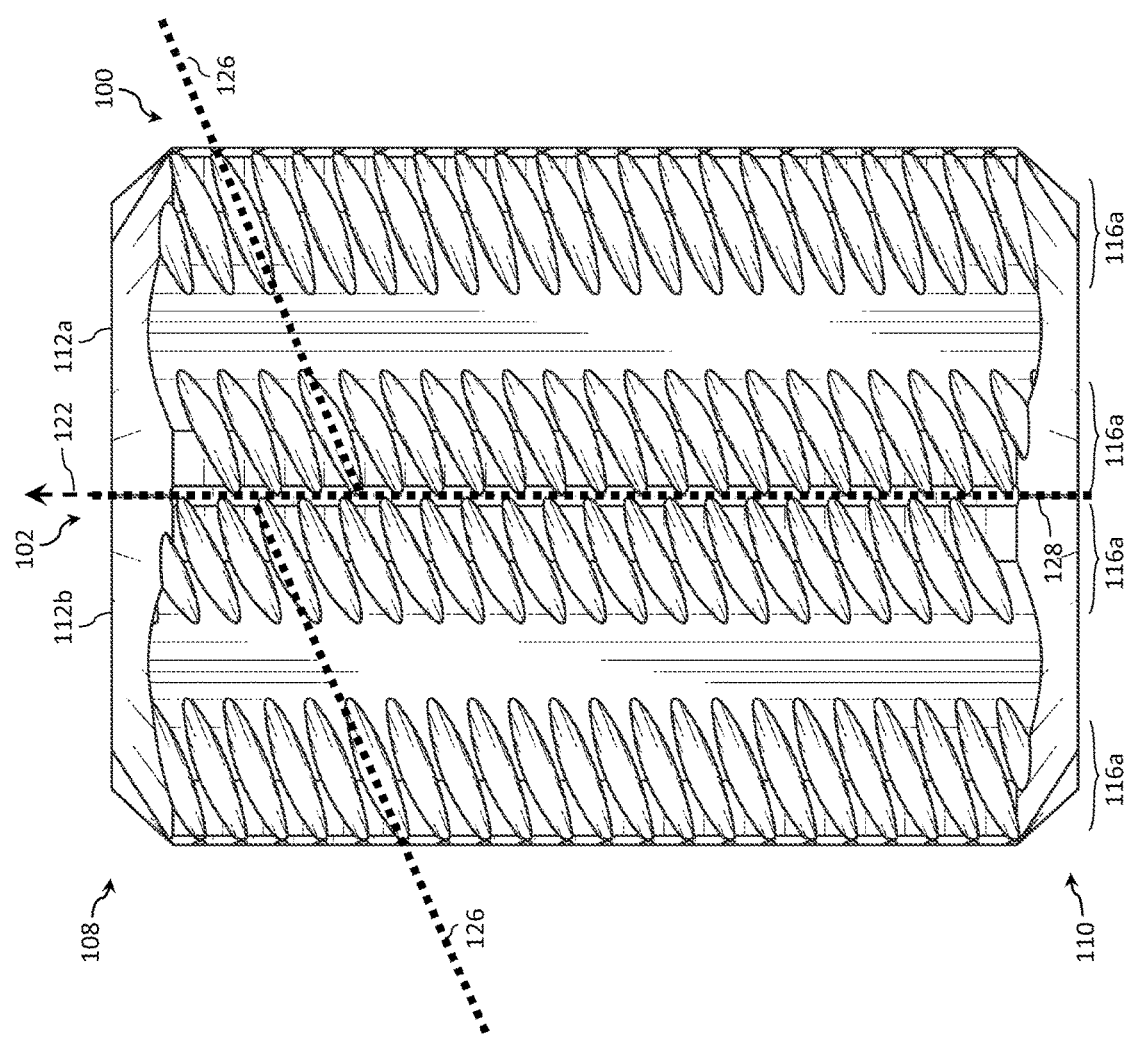

FASTENER INSERT

CROSS-REFERENCE

The present application claims priority to U.S. Provisional Patent Application No. 63/232,824, filed Aug. 13, 2021, and entitled "Fastener Insert," which is hereby incorporated by reference in its entirety.

FIELD

The present disclosure relates generally to fasteners and fastener systems, and, more particularly, to fastener components of fastener systems that are embedded in another component, often of dissimilar material.

BACKGROUND

Fastening systems sometimes employ a fastener insert that can be embedded in an anchor component. The fastener insert may be configured to secure a fastener in order to fix another component relative to the anchor component in an assembly. For example, anchor components, such as plastic parts in automobiles, computers, appliances of different types, and various other assemblies, can be provided with metal inserts having internal threads such that another component can be held thereto by a threaded fastener engaged with the threaded insert. In some examples, a threaded stud can be coupled to the fastener insert and secured to the other component via a nut engaged with the threads of the stud.

While effective, existing fastener inserts can be expensive to manufacture. Therefore, a need exists for a fastener insert that can be more economically manufactured while meeting fastening demands.

SUMMARY

The present disclosure relates generally to fasteners and fastener systems, and, more particularly, to a fastener insert, substantially as illustrated by and described in connection with at least one of the figures, as set forth more completely in the claims.

DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

FIGS. 1a and 1b illustrate perspective views of an example fastener insert in accordance with an aspect of this disclosure.

FIGS. 1c through 1f illustrate, respectively, top, bottom, front, and side elevation views of the example fastener insert of FIGS. 1a and 1b.

FIGS. 2a through 2c illustrate example groove patterns in accordance with other aspects of this disclosure.

DESCRIPTION

Figure 1D:
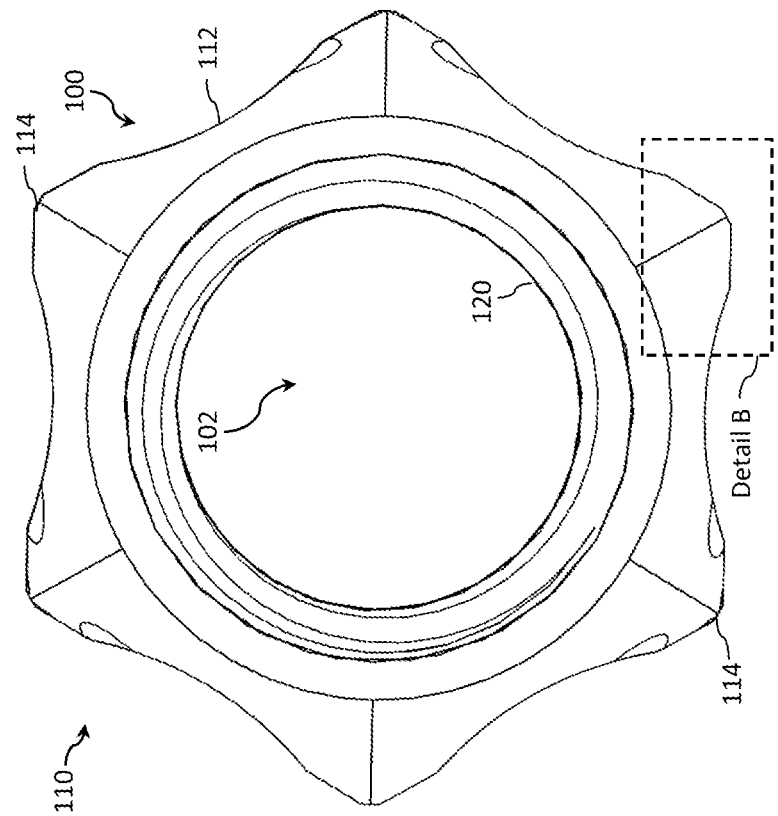
Figure 1D:
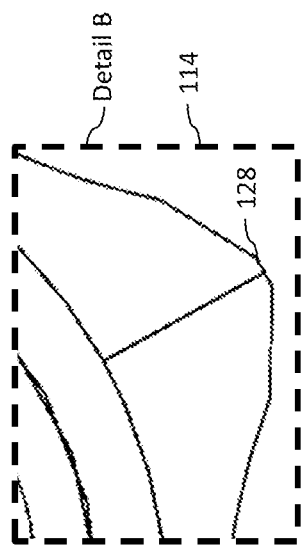

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within and/or including the range, unless otherwise indicated herein, and each separate value within such a range is incorporated into the specification as if it were individually recited herein. In the following description, it is understood that terms such as "first," "second," "top," "bottom," "side," "front," "back," and the like are words of convenience and are not to be construed as limiting terms. For example, while in some examples a first side is located adjacent or near a second side, the terms "first side" and "second side" do not imply any specific order in which the sides are ordered.

The terms "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the disclosure. The use of any and all examples, or exemplary language ("e.g.," "such as," or the like) provided herein, is intended merely to better illuminate the disclosed examples and does not pose a limitation on the scope of the disclosure. The terms "e.g.," and "for example" set off lists of one or more non-limiting examples, instances, or illustrations. No language in the specification should be construed as indicating any unclaimed element as essential to the practice of the disclosed examples.

The term "and/or" means any one or more of the items in the list joined by "and/or." As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y, and/or z" means "one or more of x, y, and z."

Various techniques may be employed to secure two or more components via an embedded component, such as a threaded insert or stud, in the plastic or other material. Simple threaded engagement can be used that have threads on the outer surface of the embedded component (e.g., insert). In a process known as heat-staking, a metal part, such as a threaded female insert, stud, or the like, is heated and pushed into the anchor component (e.g., a plastic component, such as a plastic-injected component) in which it is to be held, melting and fusing the interfacing plastic surface thereto. Heat-staking and can be performed relatively inexpensively. Ultrasonic insertion is also known whereby the part is vibrated ultrasonically and pushed into the anchor component. Ultrasonic insertion can be performed relatively quickly, but the process tends to be expensive. In purely mechanical process, the component to be embedded (or otherwise anchored) comprises an outer surface having a knurled surface (or otherwise configured outer surface) that can be simply pushed into the anchor component. Such mechanical insertion can be performed quickly, but the machining process required to form the outer surface of the insert traditionally adds significantly to overall cost. Further, mechanical insertion tends to channel or direct the material of the anchor component, and it can be difficult to achieve significant holding strength against pullout with current push-in inserts. Further, to facilitate easy and rapid machining of inserts, it has been known to use expensive materials, such as brass. Knurls, undercuts and other such formations can be formed readily in brass; however, the costs of parts made of such materials are high.

In view of the foregoing, advantages can be obtained from providing an insert having a surface configuration that can be manufactured quickly and easily with efficient processes using inexpensive materials and that can be inserted into plastic or other anchor components in a rapid, cost efficient process while providing significant resistance to both pullout and rotation in the completed assembly. Other features and advantages of the invention will become apparent to those skilled in the art upon review of the following detailed description, claims, and drawings.

In one example, a fastener insert comprises: an embeddable shank having an exterior surface and an axial opening therethrough, said embeddable shank configured to be inserted, embedded, and locked into a component, wherein the exterior surface defines a plurality of lobes extending about said embeddable shank, each of the plurality of lobes having a leading edge; and a plurality of grooves on the exterior surface, the plurality of grooves comprising a first groove series composed of a first series of parallel grooves and a second groove series composed of a second series of parallel grooves, wherein the first groove series and the second groove series are positioned on opposite sides of the leading edge. In some examples, the first groove series and the second groove series are arranged to form a chevron groove pattern at the leading edge. A chevron groove pattern can be formed on each of the plurality of lobes, which may comprises six lobes. In some examples, the axial opening is threaded and configured to receive a threaded fastener and/or a rod. In some examples, the axial opening comprises a clip or a detent mechanism. Each groove of the first groove series and of the second groove series may define a lateral axis that is neither perpendicular to the leading edge nor parallel to the leading edge. Additionally or alternatively, each groove of the first groove series defines a first lateral axis and each groove of the second groove series defines a second lateral axis that is parallel to the first lateral axis. In some examples, the embeddable shank is a unitary body, which may be cold-formed and composed of steel. In some examples, the component is a plastic component and the fastener insert is configured to be mechanically inserted into a cavity formed in the component. In another example, the component is a plastic component and the fastener insert is configured to be inserted into the component via a heat-staking process. In some examples, the component is a plastic-injected component and the fastener insert is configured to be inserted into the component during a plastic injection molding process.

FIGS. 1*a* and 1*b* illustrate perspective views of an example fastener insert 100 in accordance with an aspect of this disclosure, whereas FIGS. 1*c* through 1*f* illustrate, respectively, top, bottom, front, and side elevation views of the example fastener insert 100 of FIGS. 1*a* and 1*b*. The fastener insert 100, which is illustrated as a female threaded fastener insert, generally comprises an embeddable shank 101 having an exterior surface 106 and an axial opening 102 therethrough. The embeddable shank 101 is configured to be inserted, embedded, and locked into an anchor component. The exterior surface 106 defines a plurality of lobes 114 extending about said embeddable shank 101, each of the plurality of lobes 114 having a leading edge 128. A plurality of grooves 116 are formed on the exterior surface 106. In some examples, the plurality of grooves 116 comprises a first groove series 116*a* composed of parallel grooves 116 and a second groove series 116*b* composed of parallel grooves 116. In the illustrated example, the first groove series 116*a* and the second groove series 116*b* are positioned on opposite sides of the leading edge 128 and arranged to form a chevron groove pattern 118 at the leading edge 128; however, as will be discussed, other arrangements are contemplated. The chevron groove pattern 118 can be formed on the exterior surface 106 of the fastener insert 100 via, for example, a cold-forming technique or other process. FIGS. 1*g* and 1*h* illustrate enlarged side elevation views of the chevron groove pattern 118 of FIGS. 1*e* and 1*f*.

An advantage of the described fastener insert 100 over prior fastener inserts is the fastener insert 100 requires less material and is easier to manufacture. For example, the fastener insert 100 can be manufactured efficiently from inexpensive metal, such as steel, and altered in a rolling process utilizing dies to form the desired surface characteristics. While the fastener insert 100 may be fabricated using a cold-forming technique or process, other techniques are contemplated. In some examples, the fastener insert 100 is progressively formed by forcing a piece of metal into various dies at high pressure, after which the grooves 116 are formed by a rolling or cutting process. In some examples, the fastener insert 100 may be fabricated from one or more materials, including, inter *alia*, steel (including stainless steel and steel alloy), brass, bronze, etc. Accordingly, the fastener insert 100 can be manufactured efficiently and inexpensively. Of course, more expensive materials can be used for installations requiring specific metal characteristics. Still other materials can be used and manufacturing processes other than a rolling process can also be used if desired.

As will become apparent, the fastener insert 100 offers several advantages. For example, the below-described lobes 114 and chevron groove pattern 118 of the fastener insert 100 are draw formed in the cold-forming process, thus obviating the need for a secondary rolling process. Further, as will be described, the fastener insert's 100 modified polygonal shape formed by the lobes 114 allows for the fastener insert 100 to be processed using more effective bent shank tapping in manufacturing. Further, as can be appreciated from the figures, the fastener insert 100 does not require a flange, thus removing excess material needed for applications requiring bearing surface. Finally, the fastener insert 100 is less inhibited by inner diameter (ID)/outer diameter (OD) relationships needed for rolling.

The fastener insert 100 can be embodied as a hollow embeddable shank 101 having an axial opening 102 therethrough. In some examples, the fastener insert 100 is manufactured as a unitary body. For example, the fastener insert 100 may be fabricated from a single material as a solid component, where the various features are added via one or more machining processes (e.g., cutting, drilling, knurling, etc.). The axial opening 102 may be threaded or otherwise configured to receive another component (e.g., a fastener) in a fastener system to form a fastener assembly. In the illustrated example, the axial opening 102 extends from a first end 108 (e.g., a head or proximal end) of the fastener insert 100 to a second end 110 (e.g., distal end) thereof. In other examples, the axial opening 102 may pass only partially through the fastener insert 100, leaving one end (e.g., the second end 110) closed or capped off. Such an example may be useful when it is desirable to prevent a fastener from passing entirely though the fastener insert 100.

The fastener may be, for example, a threaded fastener (e.g., screw, bolt, etc.) or an unthreaded fastener (e.g., a stud, rod, dowel, etc.). In examples in which a threaded fastener is desired, the inner surface 104 of the axial opening 102 may be shaped with one or more internal threads 120 that corresponded with the threads of the threaded fastener. As illustrated, each internal thread 120 may be an inward-facing protrusion or ridge projecting from the inner surface 104 of the axial opening 102. The axial opening 102 defines longitudinal axis 122 that generally coincides with the axis of rotation of rotation in threaded fastener applications. In other examples, the inner surface 104 of the axial opening 102 may be void of internal threads 120 and used with an unthreaded fastener. In yet another example, the axial opening 102 may include (or define) other attachment features, such as a clip or a component of a detent mechanism. For example, a detent mechanism may comprise a follower and a detent, which move relative to one another. The follower may be spring loaded and configured to press against the detent. For example, the detent may be a hole or impression that allows the follower to partially fall into it. In some examples, the detent may be positioned in the axial opening 102, while the follower may be part of the fastener.

Figure 1C:
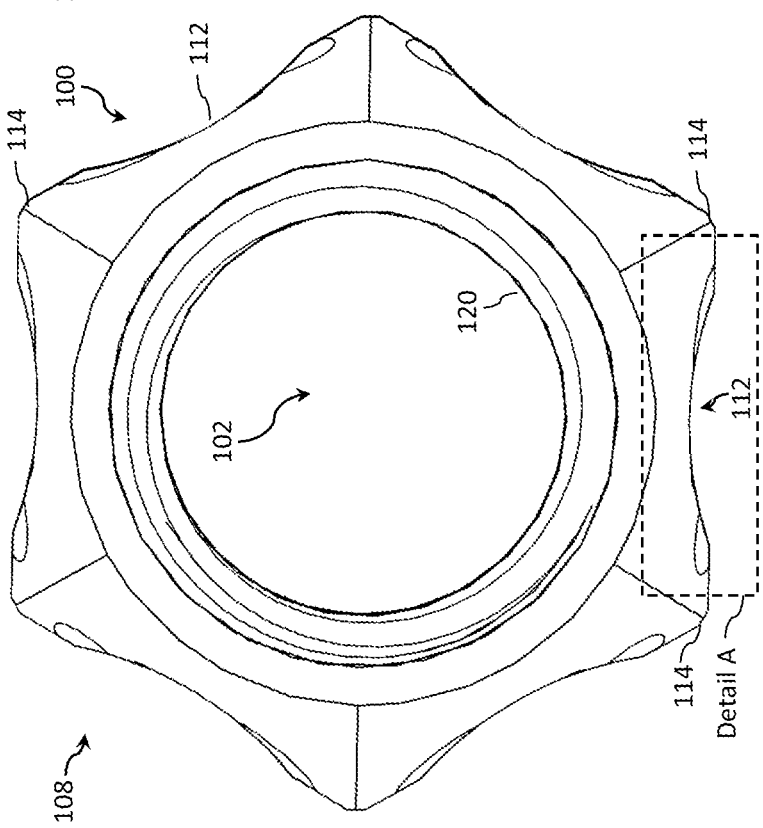
Figure 1C:
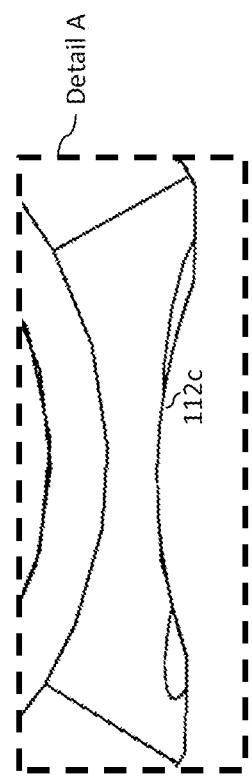
Figure 1G:
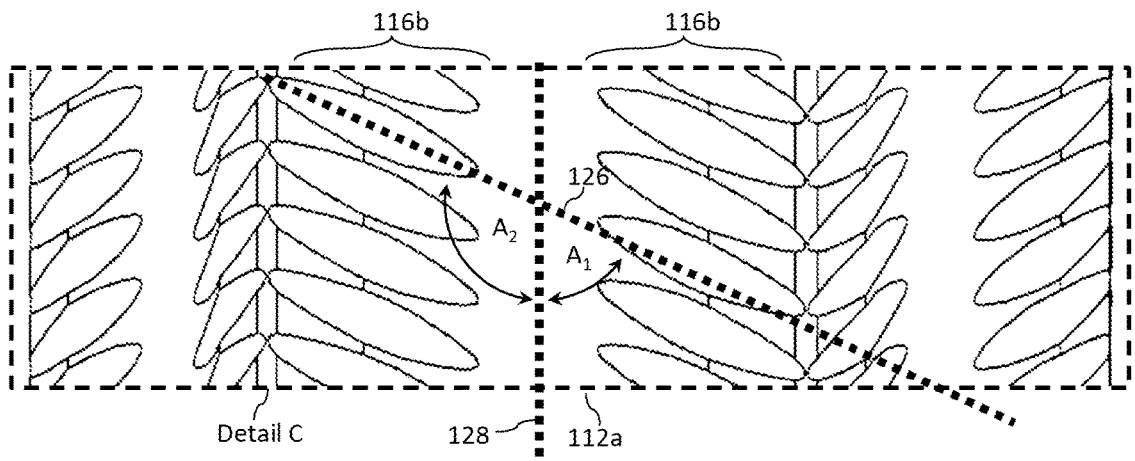
FIGS. 1g and 1h illustrate enlarged side elevation views of the example chevron groove pattern of FIGS. 1e and 1f.
Figure 1H:
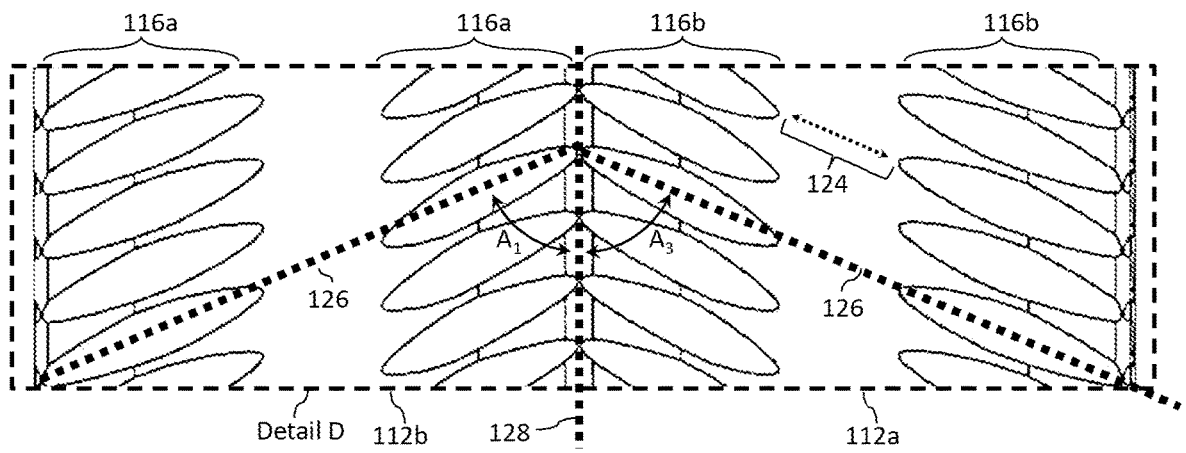

As best illustrated in FIGS. 1c and 1d, the exterior surface 106 of the fastener insert 100 may be shaped to define a modified polygonal cross section having a plurality of lobes 114 and a plurality of surfaces 112. An enlargement of the surface 112 is illustrated in FIG. 1c at Detail A, whereas an enlargement of the lobe 114 is illustrated in FIG. 1d at Detail B. As best illustrated in FIG. 1c, the plurality of surfaces 112 are concave (i.e., not flat, which would be the case with a true polygon) to define a valley 112c. In some examples, such as the case of an insert with an M6 threaded internal diameter, the radii on the indented curvature shall maintain a ratio of 4:1 between the convex and concave radii. The depth of said radii can be in volumetric proportion to the creation of the concave radii, in this case the depth of the radii can extend 0.28 mm past the created plane that encompasses two adjacent lobes 114 and a perpendicular axis to centerline axis (e.g., longitudinal axis 122) relative to said plane. One of skill in the art would appreciate that these dimensions are approximated and can deviate based on, for example, natural flow of cold-formed material in knurling process. While the fastener insert 100 is illustrated with six surfaces 112 and six lobes 114 (resembling a modified hexagon), additional or fewer lobes 114 may be employed. In some examples, the fastener insert 100 may include as few as three, four, or five surfaces 112 and three, four, or five lobes 114 (akin to a triangle, quadrilateral, or pentagon). In other examples, the fastener insert 100 may include seven or more surfaces 112 and seven or more lobes 114 (akin to a heptagon or the like). Regardless of the number of lobes 114, a chevron groove pattern 118 can be formed on each of the plurality of lobes 114 to increase mechanical engagement (e.g., to increase both rotation and pullout resistance) with the anchor component. The leading edge 128 of each lobe 114 runs lengthwise between the first end 108 and second end 110 of the fastener insert 100. Each leading edge 128 is substantially parallel to the longitudinal axis 122.

As best illustrated in FIGS. 1e and 1h, the plurality of grooves 116 are arranged to form a chevron groove pattern 118 relative to the leading edge 128 of each lobe 114. Each of the plurality of grooves 116 defines a lateral axis 126 that is angled relative to the leading edge 128. That is, each groove 116 of the first groove series 116a and of the second groove series 116b defines a lateral axis 126 that is neither perpendicular to the leading edge 128 nor parallel to the leading edge 128. As illustrated, each chevron groove pattern 118 is generally composed of a first groove series 116a composed of parallel grooves 116 and a second groove series 116b composed of parallel grooves 116 that, in some examples, complement the first groove series 116a.

As illustrated in FIG. 1g, for example, the grooves 116 on a given surface (e.g., first surface 112a) form, relative to the longitudinal axis 122, a first angle $A_1$ and a supplementary second angle $A_2$. In some examples, the first angle $A_1$ is an acute angle between 1 and 89 degrees, between about 10 to 80 degrees, or between about 25 to 50 degrees, while the second angle $A_2$ is an obtuse angle between 91 and 179 degrees, between about 100 to 170 degrees, or between about 115 to 140 degrees. With reference to FIG. 1h, for example, the grooves 116 form, relative to the leading edge 128, a first angle $A_1$ and a third angle $A_3$. In the example of FIG. 1h, the first angle $A_1$ and the third angle $A_3$ are equal to one another. In other examples, however, the first angle $A_1$ and the third angle $A_3$ are not equal to one another. For example, both the first angle $A_1$ and the third angle $A_3$ may be acute angles, but the first angle $A_1$ may be an acute angle that is greater than (or less than) the third angle $A_3$.

Figure 1I:
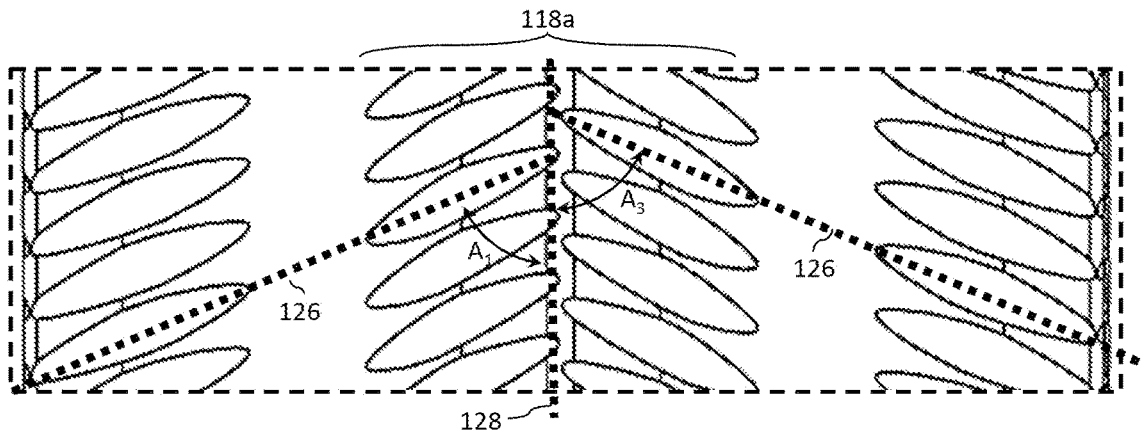
FIG. 1i illustrate an enlarged side elevation view of the example chevron groove pattern in accordance with another aspects of this disclosure.

As illustrated, each of the grooves 116 on a given surface 112 are parallel to one another. For example, the first surface 112a is illustrated as having only grooves 116 arranged to form the second groove series 116b, while the second surface 112b is illustrated as having only grooves 116 arranged to form the first groove series 116a. Further, the grooves 116 adjacent one leading edge 128 may be spaced apart from corresponding grooves 116 adjacent the other leading edge 128 by a gap 124. The gap 124 can be formed by selecting a groove cut depth that does not extend beyond the lowest point of valley 112c of the concave surface 112. With reference to FIG. 1h (Detail D), for example, the second groove series 116b on the right side of the first surface 112a is spaced apart from the second groove series 116b on the left side of the first surface 112a by gap 124. In some examples, as best illustrated in FIG. 1i, the parallel grooves 116 on the one side of the leading edge 128 may be offset relative to the parallel grooves 116 on the opposite side of the leading edge 128 to form an offset chevron groove pattern 118a.

The external chevron groove pattern 118 formed on the fastener insert 100 can provide both rotation and pullout resistance without requiring complex undercuts on knurled formations. That is, the alternating angles of the parallel grooves 116 in the chevron groove pattern 118 serve to mitigate rotational movement of the fastener insert 100 during use. As a result, the fastener insert 100 can provide the anti-rotation and pullout resistance performance of expensive, machined inserts, typically of brass, but with the cost advantages of low cost, cold-formed steel. For example, tensile testing has demonstrated that the tensile-pull strength of a fastener insert 100 is greater than 2,000 Newtons, typically at least about 2,500 Newtons. The fastener inserts 100 used during testing had an inner diameter of about 9.0 mm and an outer diameter of about 14.3 mm.

Figure 2A:
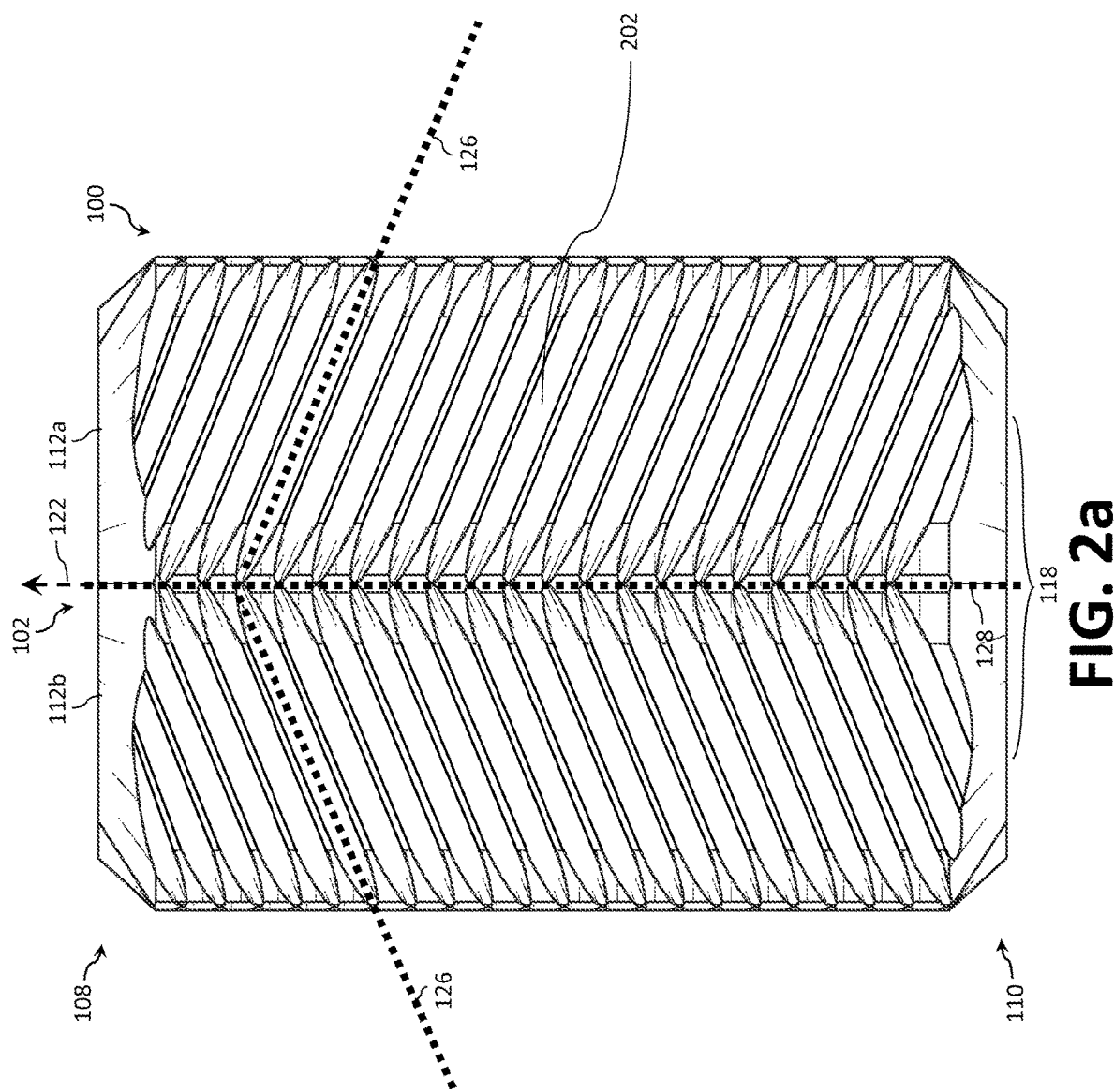

While a gap 124 is illustrated on each surface 112, each of the grooves 116 may be continuous between the leading edges 128 (i.e., bridging the gap 124) by cutting deeper grooves 116 into surface 112 of the fastener insert 100. An example of which is illustrated in FIG. 2a. Depending on the cut depth and the shape of the blade used to cut or carve the grooves 116, the grooves 116 may be tapered (i.e., narrower) at the center point 202 along the length of each groove 116. For example, a shallow cut with a tapered blade will yield a narrower width than a deeper groove cut with the same blade.

Figure 2B:
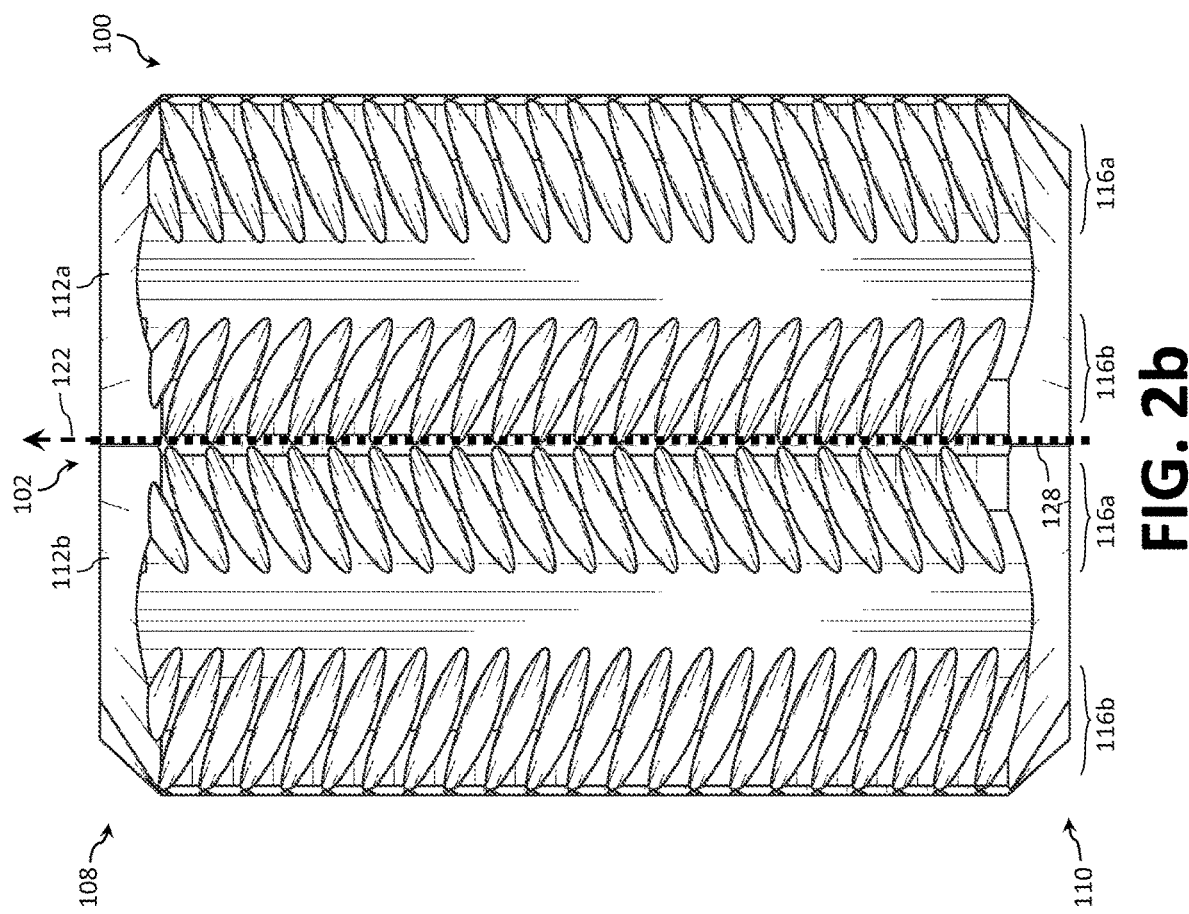

Turning back to FIGS. 1g and 1h, the direction of the chevron groove pattern 118 at each leading edge 128 is illustrated as alternating between pointing upward (toward first end 108) and pointing downward (toward second end 110). In other examples, the chevron groove pattern 118 on each of the leading edges 128 may point in the same direction. An example of which is illustrated in FIG. 2b. In this example, each surface would have grooves 116 oriented at the same angle. That is, each groove 116 of the first groove series 116a defines a first lateral axis 126 and each groove 116 of the second groove series 116b defines a second lateral axis 126 that is parallel to the first lateral axis 126.

As illustrated, the chevron groove patterns 118 each point upward (toward first end 108). In another example, all surfaces of the fastener insert 100 may have all grooves arranged in the same direction. FIG. 2c illustrates an example where all grooves 116 are arranged as the first groove series 116a. Arranging all grooves 116 in the same direction may reduce the fastener insert's 100 resistance to torsional forces. In other examples, the grooves 116 may be distributed evenly along the entire length of the fastener insert 100 (as illustrated), or a just a portion thereof. In some examples, the fastener insert 100 may include grooves 116 of different dimensions along the length (e.g., a different count per inch or angles).

The grooves 116 used to form the chevron groove pattern 118 can be manufactured efficiently and quickly by rolling processes utilizing dies and less expensive materials, such as steel, which may be a cold-formed steel. In some examples, the fastener insert 100 is made from steel to achieve better mechanical properties as well as versatility in a brass insert dominated market. The fastener insert 100 is a light-weighted threaded insert for various applications, include plastic injection molding. The fastener insert 100 can be either post installed or over molded and is bi-directional, thereby assisting in the manufacturing process by the component fabricator.

In some examples, the anchor component (i.e., the first component 302) is a plastic component. The fastener insert 100 may be embedded in the first component 302 using one of multiple techniques. For example, the fastener insert 100 can be mechanically inserted into a cavity 314 formed in the component 302, inserted into the component 302 via a heat-staking process, or inserted into the component 302 during a plastic injection molding process. Upon insertion, material of the first component 302 (e.g., plastic) flows into the grooves 116 (e.g., the chevron groove pattern 118) and around the lobes 114 to form a high-friction bond. The chevron groove pattern 118 help with insert pull out, while the lobes 114 assist in inset torque out.

Figure 3B:
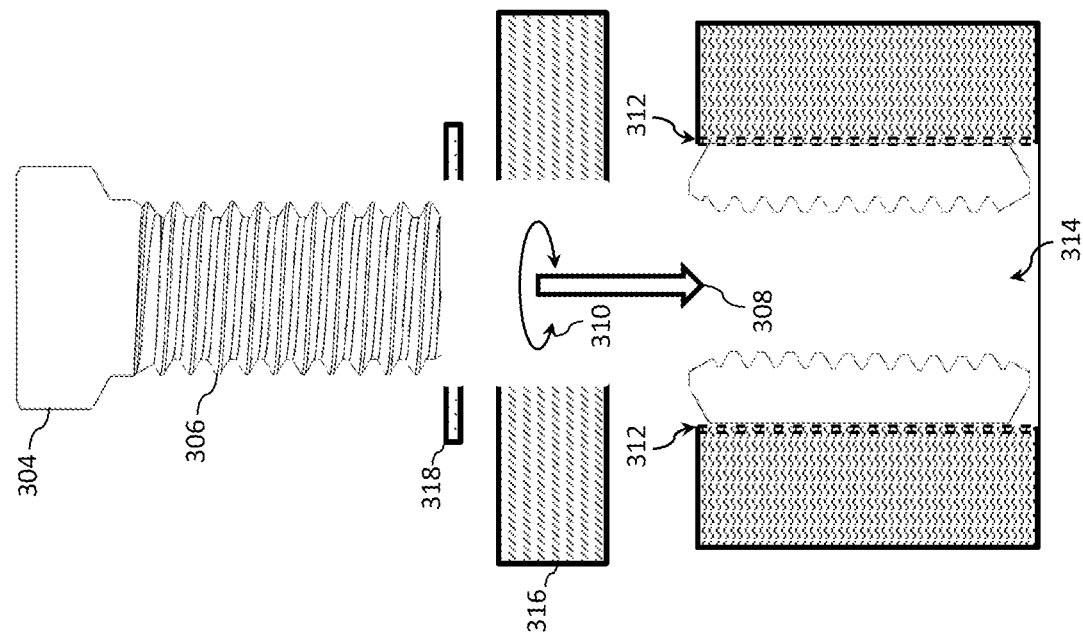
FIGS. 3a through 3c illustrate assembly diagrams for installing the fastener insert in a system.
Figure 3A:
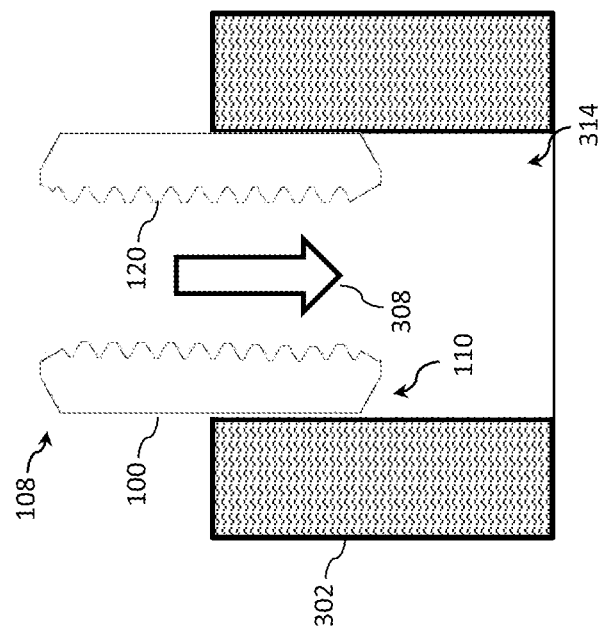
Figure 3C:
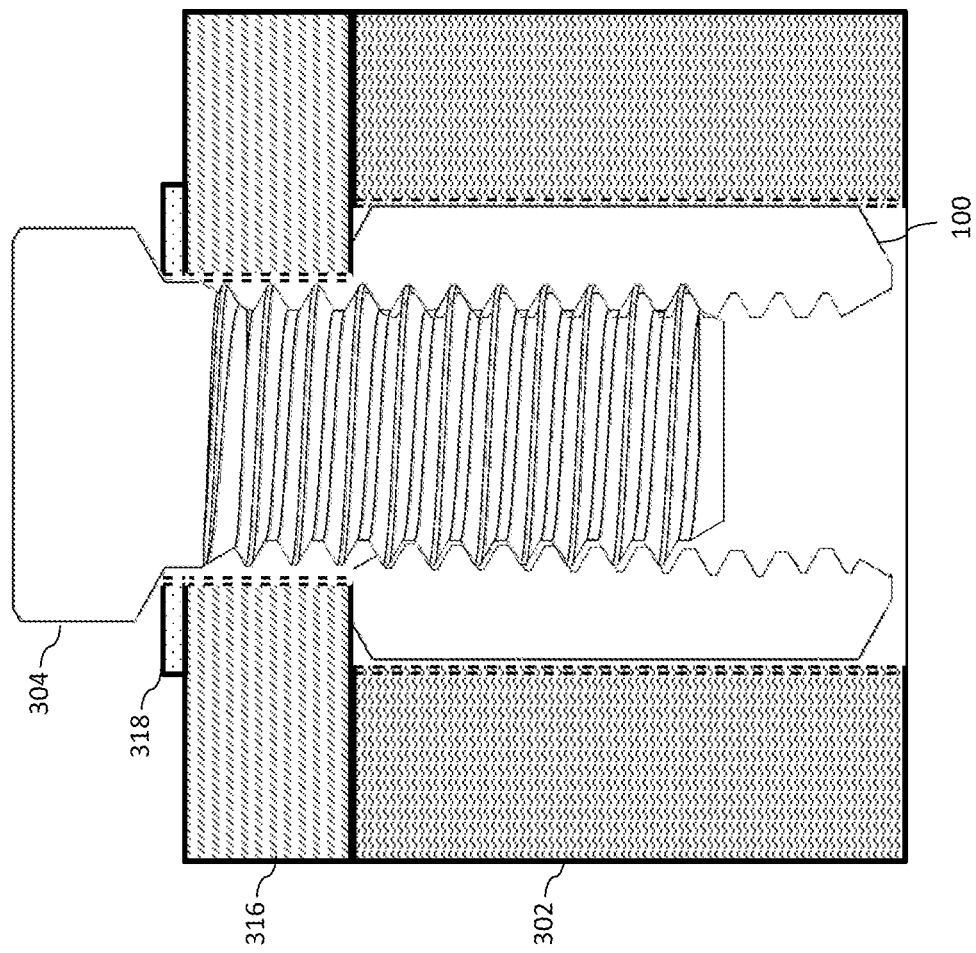

FIGS. 3a through 3c illustrate assembly diagrams of installing the fastener insert 100 and joining a first component 302 and a second component 316 via a stud or fastener, such as the illustrated threaded fastener 304. FIG. 3a illustrates the step of attaching the fastener insert 100 to the first component 302. The fastener insert 100 may be inserted during the plastic injection molding process used to form the first component 302, or applied after the first component 302 is formed (i.e., pre-formed). Where the first component 302 is pre-formed, a cavity 314 may be formed in the first component 302 (whether during the molding process or drilled afterward). The fastener insert 100 may be inserted into the cavity 314 in the direction indicated by arrow 308. A sharp point, tip, or chamfer may be provided at the second end 110 to aid in penetrating into the first component 302. In some examples, the fastener insert 100 may be heated during or prior to assembly. In other examples, the fastener insert 100 is positioned in the mold cavity of the first component 302 and/or inserted before the first component 302 hardens or cures. In either case, material flows into grooves 116 to form a high-friction bond 312 between the first component 302 and the exterior surface 106. For example, during the installation process, which may be performed by heat-staking, material flows into grooves 116, and substantially fill the grooves 116.

The material of the first component 302 flows into the grooves 116 (e.g., the chevron groove pattern 118) and around the lobes 114 to increase the high-friction bond 312 between the fastener insert 100 and the first component 302. FIG. 3b illustrates a fastener being inserted into the fastener insert 100 to attach the second component 316. In examples where the fastener insert 100 includes an inner surface 104 that is threaded, a threaded fastener 304 can be used. As can be appreciated, the threaded fastener 304 comprises fastener threads 306 that correspond to the internal thread(s) 120.

As illustrated, the threaded fastener 304 passes through an opening formed the second component 316 (and possibly a washer 318, where needed or desired) and into the cavity 314 of the fastener insert 100. In some examples, the diameter of the opening in the second component 316 is less than the diameter of the cavity 314 in the first component 302 since the opening in the second component 316 need not accommodated the outer diameter of the fastener insert 100. In operation, the openings are arranged coaxially relative to one another to define a passage way for the threaded fastener 100. The threaded fastener 304 is attached to the fastener insert 100 through rotation about its axis of rotation (as indicated by arrow 310). The axis of rotation may be clockwise or counter-clockwise, depending on the pitch of the threads.

As the threaded fastener 304 is driven about the axis of rotation (arrow 310) in the rotational direction through the opening formed in the second component 316, the fastener threads 306 engage the internal threads 120. As the threaded fastener 304 continues to rotate, the threading (i.e., fastener threads 306 and internal threads 120) causes the threaded fastener 304 to translate into the cavity 314. FIG. 3c illustrates the threaded fastener 304 fully seated in the fastener insert 100 such that the first component 302 and second component 316 are coupled to one another.

Inserts having the chevron groove patterns 118 described herein work well when installed by a process that provides plastic material flow into the inter-thread channels between the threads, where the plastic will freeze after fastener insert 100 is installed. The thread will then push against the plastic to resist both pullout and rotation. The chevron groove pattern 118 forms described herein can work well for many types of inserted fastener components, including the female threaded inserts 100 described herein for use a threaded fastener anchors or anchors for other components having threaded elements thereon.

To that end, the fastener insert 100 described herein can be installed by heat staking in plastic and by other means. Heat-staking works particularly well for installing fastener insert 100 described herein in that plastic, such as first component 302 or another body, into which fastener insert 100 is installed can melt and flow into the grooves 116. The material of the first component 302 in which fastener insert 100 is installed preferably to flows into the grooves 116 to lock fastener insert 100 in position. Accordingly, insertion techniques other than heat staking also can be used. Further, direct placement in molded components during the molding process, or subsequent fill of molten material in a pocket including fastener insert 100 can also suitably anchor the fastener inserts 100 by injecting molten material around the fastener insert 100. The fastener inserts 100 can also work well when anchored in components of material other than plastic when the material immediately surrounding fastener insert 100 is provided in a molten or liquid state to fill grooves 116 and subsequently harden.

Filling the grooves 116 increases resistance to both rotation and pullout via the chevron groove pattern 118 and the more circumferentially oriented lobes 114 engaging the first component 302. The lobes 114 resist rotation of fastener insert 100 in the first component 302, and the chevron groove pattern 118 resist pullout of fastener insert 100 from the first component 302. The length, height, and frequency (e.g., quantity and/or spacing) of the grooves 116 and/or chevron groove pattern 118, along with the lobes 114, can be adjusted to achieve the desired resistance to pullout and resistance to rotation of a particular insert in a specific material.

It should be understood that the chevron groove patterns 118 described herein can be used also on the embedded portions of many anchored male and female components, such as, for example, male or stud components of other types such as ring studs, ball-ended studs designed to snap-fit into other components, or an anchored stud having any other type of end configuration suitable for a purpose. For example, the stud could define a hook, a nail point, an electrical contact or other configuration, whether complex or simple. Other embedded male components, female components and neutral anchored devices also can use chevron groove patterns 118 as described herein. Further, surfaces with grooves 116, lobes 114, and/or chevron groove patterns 118 disclosed herein can be used for other than straight shanks as well as stepped shanks, and can be provided on all or just a portion of the embeddable length of an insert.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

The invention claimed is:

1. A fastener insert, comprising:
   an embeddable shank defining a longitudinal axis and having an exterior surface and an axial opening therethrough, said embeddable shank configured to be inserted, embedded, and locked into a component,
   wherein the exterior surface defines a plurality of lobes extending about said embeddable shank, each of the plurality of lobes having a leading edge; and
   a plurality of grooves on the exterior surface, the plurality of grooves comprising a first groove series composed of a first series of parallel grooves, each groove of the first groove series defining a first lateral axis and a second groove series composed of a second series of parallel grooves, each groove of the second groove series defining a second lateral axis,
   wherein the first lateral axis and the second lateral axis are angled relative to the leading edge and intersect one another at the leading edge, and
   wherein the first groove series and the second groove series are positioned on opposite sides of the leading edge.

2. The fastener insert of claim 1, wherein the first groove series and the second groove series are arranged to form a chevron groove pattern at the leading edge.

3. The fastener insert of claim 2, wherein a chevron groove pattern is formed on each of the plurality of lobes.

4. The fastener insert of claim 1, wherein the plurality of lobes comprises six lobes.

5. The fastener insert of claim 1, wherein the axial opening is threaded and configured to receive a threaded fastener.

6. The fastener insert of claim 1, wherein the axial opening is configured to receive a rod.

7. The fastener insert of claim 1, wherein the axial opening comprises a detent mechanism.

8. The fastener insert of claim 1, wherein each groove of the first groove series and of the second groove series defines a lateral axis that is neither perpendicular to the leading edge nor parallel to the leading edge.

9. The fastener insert of claim 1, wherein each groove of the first groove series defines a first lateral axis and each groove of the second groove series defines a second lateral axis that is parallel to the first lateral axis.

10. The fastener insert of claim 1, said grooves defining a chevron groove pattern on each of the plurality of lobes.

11. The fastener insert of claim 1, wherein the embeddable shank is a unitary body.

12. The fastener insert of claim 1, wherein the embeddable shank comprises steel.

13. The fastener insert of claim 1, wherein the embeddable shank is cold-formed.

14. The fastener insert of claim 1, wherein the embeddable shank of the fastener insert is configured to be mechanically inserted into a cavity formed in the component.

15. The fastener insert of claim 1, wherein the embeddable shank of the fastener insert is configured to be inserted into the component via a heat-staking process.

16. The fastener insert of claim 1, wherein the embeddable shank of the fastener insert is configured to be inserted into the component during a manufacturing process of the component.

17. A fastener insert, comprising:
   an embeddable shank having an exterior surface and an axial opening therethrough that is configured to receive a fastener, said embeddable shank configured to be inserted, embedded, and locked into a first component,
   wherein the exterior surface defines a plurality of lobes extending about said embeddable shank, each of the plurality of lobes having a leading edge; and
   a plurality of grooves that are cold-formed on the exterior surface, the plurality of grooves comprising a first groove series composed of parallel grooves and a second groove series composed of parallel grooves, wherein the first groove series and the second groove series are positioned on opposite sides of the leading edge and arranged to form a chevron groove pattern at the leading edge.

18. The fastener insert of claim 17, wherein a chevron groove pattern is formed on each of the plurality of lobes.

19. The fastener insert of claim 17, wherein the plurality of lobes comprises six lobes.

20. The fastener insert of claim 17, wherein the axial opening is threaded and configured to receive a threaded fastener.

\* \* \* \* \*